United States Patent [19]

Ladney, Jr.

[11] E Re. 28,826

[45] Reissued May 25, 1976

[54] METHOD OF CONSTRUCTING MOLD FOR FORMING PLASTIC FOAM

[76] Inventor: Michael Ladney, Jr., 18125 East Ten Mile Road, East Detroit, Mich. 48021

[22] Filed: Apr. 25, 1975

[21] Appl. No.: 571,794

Related U.S. Patent Documents

Reissue of:

[64] Patent No.: 3,871,060
Issued: Mar. 18, 1975
Appl. No.: 437,792
Filed: Jan. 30, 1974

U.S. Applications:

[63] Continuation of Ser. No. 213,244, Dec. 29, 1971, abandoned.

[52] U.S. Cl. ..... 29/428; 249/112; 264/41; 264/226; 264/338; 264/DIG. 83

[51] Int. Cl.[2] ..... B23P 19/00

[58] Field of Search ..... 29/428, 463, 469, 451; 249/112; 264/41, 48, 225, 226, 227, 276, 313, 316, 338, DIG. 83

[56] References Cited

UNITED STATES PATENTS

| | | | |
|---|---|---|---|
| 2,757,426 | 8/1956 | Brennan | 249/112 X |
| 3,188,370 | 6/1965 | Gotzy | 264/226 |
| 3,325,861 | 6/1967 | Pincus et al. | 249/112 X |
| 3,373,479 | 3/1968 | Watt et al. | 264/276 X |
| 3,408,436 | 10/1968 | Cubitt | 264/338 X |
| 3,487,134 | 12/1969 | Burr | 264/226 X |
| 3,548,050 | 12/1970 | Mozer | 264/226 X |
| 3,678,987 | 7/1972 | Kydd | 264/226 X |
| 3,751,540 | 8/1973 | Prahl et al. | 264/226 X |
| 3,785,039 | 1/1974 | Huffaker et al. | 29/428 |

*Primary Examiner*—Charlie T. Moon
*Attorney, Agent, or Firm*—Barnes, Kisselle, Raisch & Choate

[57] ABSTRACT

A mold for forming plastic foam parts in which an injection-molded plastic member forms a molding surface of the foam molding cavity against which foam plastic is adapted to be molded. The plastic member is preferably injection molded in a metal molding die from either polyethylene or polypropylene so that its molding surface is the reverse of the exterior surface of the plastic part to be foam molded therein. Vent passages and sealing beads may be integrally formed with the injection-molded member.

4 Claims, 9 Drawing Figures

INVENTOR.
MICHAEL LADNEY JR.
BY
Barnes Kisselle Raisch & Choate
Attorneys

INVENTOR.
MICHAEL LADNEY JR.
BY

Barnes Kisselle Raisch & Choate
Attorneys

METHOD OF CONSTRUCTING MOLD FOR FORMING PLASTIC FOAM

Matter enclosed in heavy brackets [ ] appears in the original patent but forms no part of this reissue specification; matter printed in italics indicates the additions made by reissue.

This *is a reissue application of Pat. No. 3,871,060, which* is a continuation of application Ser. No. 213,244, filed Dec. 29, 1971 now abandoned.

This invention relates to a mold for forming plastic foam parts and a method of constructing the same.

Two types of molds which, in the past, have been used to produce foam parts on a high volume basis are metal electroform molds and poured plastic molds. Disadvantages of electroforms are that they are relatively costly and require a relatively large amount of time to manufacture. Plastic molds may be formed by hand pouring plastic (silicone elastomer, for example) into a suitable die at room temperature. When the plastic cures, it may be removed from the die and used for forming the plastic foam parts therein. One problem with plastic molds produced by this method is that they tend to wear out rather rapidly. The molds stretch and deform over the course of producing parts thereby losing detail each time a part is produced. Consequently, the per unit tooling cost of each foam part is relatively high for both of these two types of molds.

The present invention has for its main object the provision of an improved mold for forming foam plastic parts and method of making the same. The improved mold has less tendency to wear out so that it may be used to satisfactorily produce a greater number of foam plastic parts.

A further object of the invention is to provide a plastic molding cavity member for a foam mold which may be cheaply produced so that worn-out plastic molding members can be replaced at minimum expense. An advantage of the plastic molding cavity member of the invention is that two highly desirable features may be incorporated with little or no additional cost: (1) and integral vent and (2) an integral sealing bead. As will be later seen, these two features provide improved formation of the foam plastic part and reduction of foam flash respectively.

By constructing the plastic molding cavity member of the invention from either polyethylene or polypropylene, a further advantage of the invention becomes apparent. The inherent release properties of these two materials permit the foam plastic part to be removed from the mold without sticking or tearing.

Additional objects and advantages of the invention will be seen in the ensuing specification and the accompanying drawings, in which.

The present invention contemplates an improved mold for forming foam plastic parts which has an injection-molded plastic molding cavity member against which foam plastic is adapted to be molded. The injection-molded plastic foam molding cavity member is inserted into a suitable cavity formed in a metal mold to provide an improved mold for forming plastic foam parts.

Figure 1:
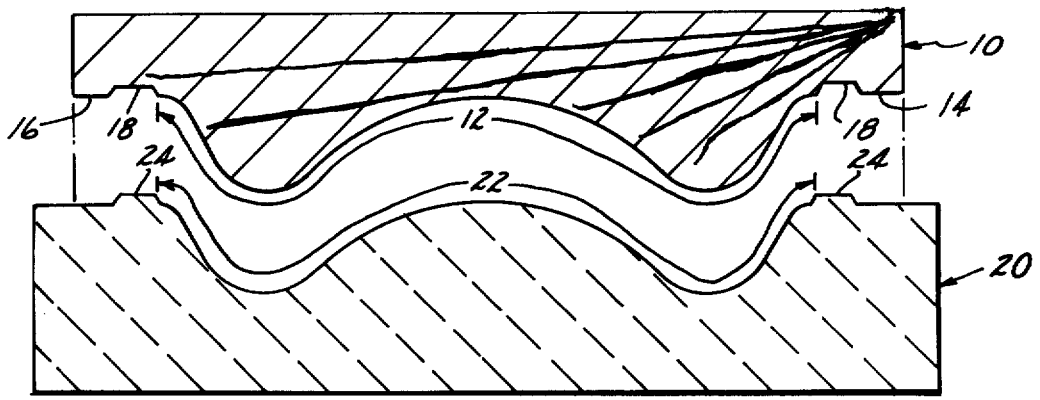
FIGS. 1 through 4 are sectional views illustrating first through fourth steps respectively in constructing the improved plastic foam mold of the present invention.
Figure 2:
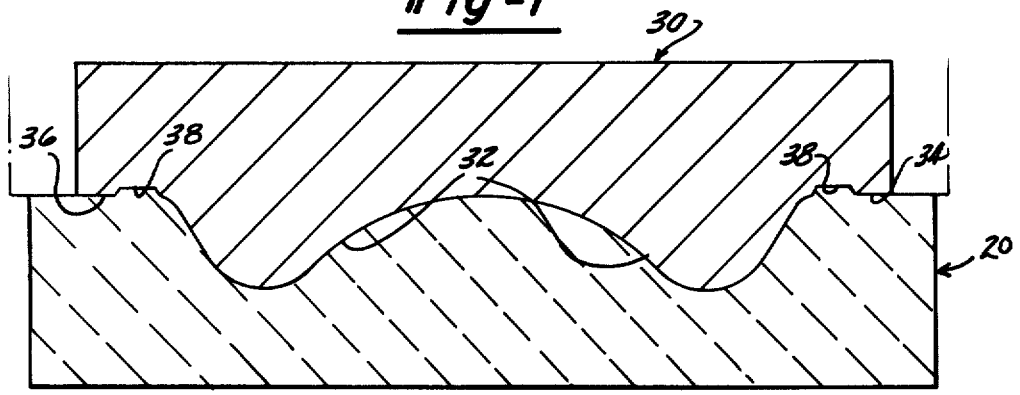
Figure 3:
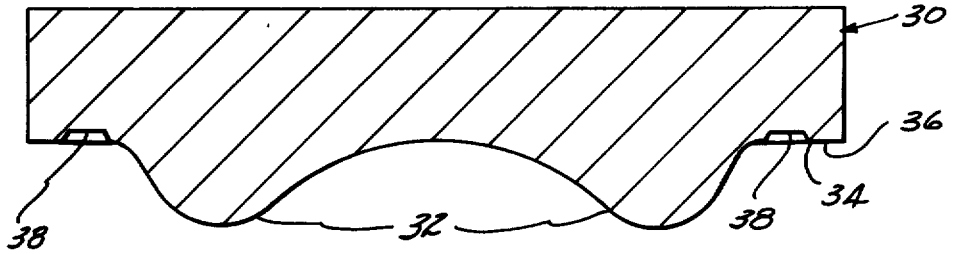
Figure 4:
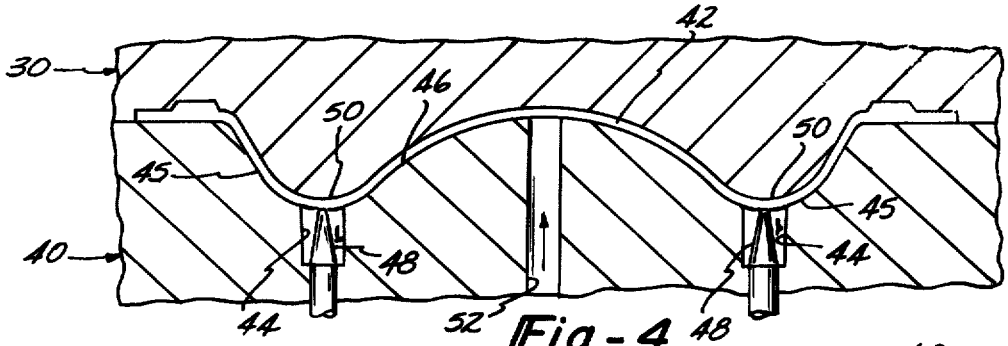
Figure 5:
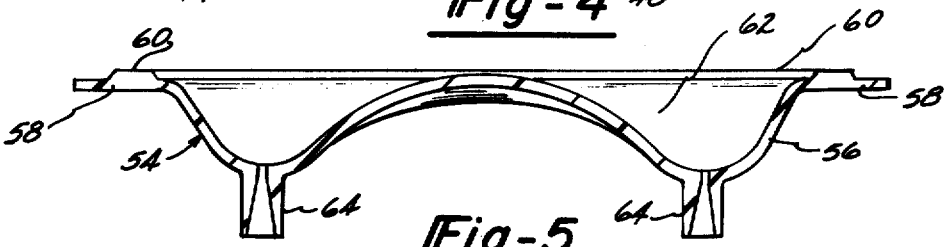
FIG. 5 is a vertical sectional view through the improved molding cavity member of the invention.

Turning now to the drawings, FIGS. 1 through 4 illustrate the steps of one method for constructing the injection-molded plastic molding cavity member of the invention which is shown by itself in FIG. 5. FIGS. 1 through 3 sequentially illustrate the steps of one of various available methods for constructing the upper half of the injection-molding die shown in FIG. 4, in which the plastic member of FIG. 5 is injection molded. In FIG. 1, a wood model 10 is first constructed as substantially the duplicate of one-half of the foam plastic part to be produced. The contoured portion 12 of model 10, which is below the parting plane 14 and inwardly of the outer periphery 16, is substantially the same shape as one-half of the foam plastic part to be molded, with due allowance being made for subsequent shrinkage of the injection-molded foam molding cavity member and the foam plastic as required. A peripheral recess 18 is formed in base 12 extending around the periphery 16. Next, a ceramic cast (an epoxy resin, for example) 20 is made from wood model 10. Cast 20 has a contour 22 which is the reverse of contour 12 and a peripheral bead 24 formed by recess 18. Kirksite (or any other castable material) may be poured onto cast 20 to form a kirksite die 30 (FIG. 2) of the same shape as wood model 10. Die 30 has a contour 32, a parting plane 34, an outer periphery 36 and a peripheral recess 38 corresponding to similar elements of wood model 10. The kirksite die 30, shown by itself in FIG. 3, may have its contoured portion 32 textured to produce a similarly textured skin in the plastic foam part which is to be formed in the plastic member which is to be injection molded in the injection-molding apparatus in which die 30 is to be mounted. If desired, other details may be added to die 30 at this time.

Referring to FIG. 4, die 30 is next mounted in an injection-molding machine (not shown) and cooperates with a mating kirksite die 40 to form the injection-molding die set which has an injection-molding chamber 42 into which plastic is injection molded. Die 40, which may be formed in the same manner as described in connection with the construction of die 30, includes bores 44 formed at the bottom of each of the two recesses 45 in its contoured portion 46. A tapered pin 48 extends into each bore 44 stopping short of the opposite protuberance 50 of die 30. When dies 30 and 40 are in the closed position of FIG. 4, a plastic such as polyethylene or polypropylene is introduced under pressure via inlet 52 to fill injection-molding chamber 42. Upon completion of the injection-molding process, dies 30 and 40 are opened and the injection-molded foam molding cavity member 54 of FIG. 5 is removed. Shrinkage of member 54 is compensated by oversizing wood model 10, as necessary.

Molding chamber 54 includes a central contoured portion 56 with a continuous outer peripheral lip 58 extending around the edge of the contoured portion. A continuous peripheral bead 60 is formed on lip 58, preferably closely adjacent the intersection of lip 58 and the contoured molding portion 56. As will be seen, the inner surface 62 of contoured portion 56, which is surrounded by bead 60, defines a foam molding cavity and forms a wall of the foam molding chamber when the foam molding member 54 is inserted into the metal mold cover of FIG. 6. Molding member 54 further includes cylindrical projections 64 at its deepest recesses. As will also become apparent from detailed description of FIG. 6, projections 64 form integral vent passages for venting the foam molding chamber to atmosphere.

Figure 6:
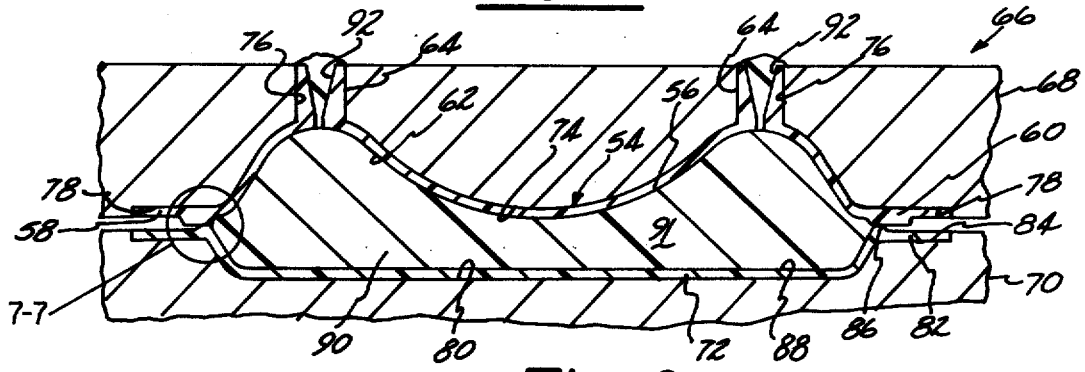
FIG. 6 is a vertical sectional view through a mold for forming plastic foam parts which incorporates improved molding cavity members of the present invention.

Now considering FIG. 6 in detail, the illustrated foam mold 66 comprises an upper mold member, or cover, 68 and a lower metal mold base, or base 70. Cover 68 is shaped to receive molding cavity member 54 while base 70 is shaped to receive a molding cavity member 72 which may be constructed by the same method as member 54 in the shape of the other half of the foam plastic part to be formed. Molding cavity member 54 is turned upside down from the position of FIG. 5 and seat snugly within a similarly contoured cavity 74 in cover 68. Projections 64 extend through bores 76 and terminate preferably substantially flush with the upper surface of cover 68. Lip 58 is received within a matching peripheral recess 78 so that bead 60 projects downwardly below the lower surface of cover 68. Cavity 72 is likewise snugly received in a similarly-shaped cavity 80 of base 70. An outer peripheral lip 82 of molding cavity 72 fits within a corresponding peripheral recess 84 in base 70 so that a bead 86, which is supported on lip 82 adjacent the foam molding surface 88 of cavity 72 extends slightly above the level of the upper surface of base 70. With mold 66 in the closed position illustrated in FIG. 6, beads 60 and 86 engage in sealing relationship to seal the periphery of the foam molding chamber 90 defined by foam molding surfaces 62 and 88 of the two foam molding cavity members. Plastic, such as polyurethane, may then be foamed in chamber 90 to form a plastic foam part 91.

Figure 8:
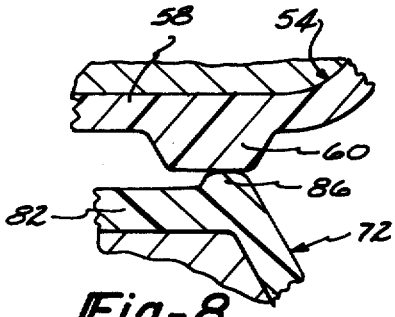
FIG. 8 is a view similar to FIG. 7 showing initial shapes of the sealing beads.
Figure 7:
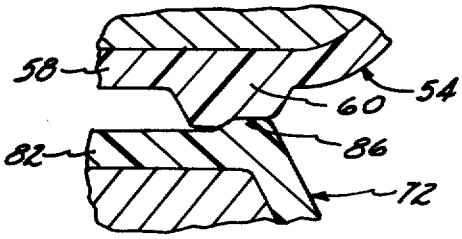
FIG. 7 is an enlarged view taken in circle 7—7 of FIG. 6 showing the integral sealing beads of the molding cavity members in sealing interengagement.

Prior to using mold 66 to form plastic foam parts, it is preferable to heat mold 66 with cover 68 in the closed position so that a tight, substantially foamproof seal is created by the interengagement of beads 60 and 86. Prior to heating, the initial cross sections of the beads are as shown in FIG. 8. While various widths of beads 60 and 86 relative to each other may be used, it has been found preferable to have one of the beads of somewhat smaller width than the other. Also, for the arrangement of FIG. 8, it is preferable to have the narrow bead adjacent the foam molding chamber so that the parting line of the finished foam part is less noticeable. The closing force on the mold halves, which may be applied by a clamp or the like (not shown), is applied between beads 60 and 86. The mold is heated to a high enough temperature so that the combined heat and pressure applied to the beads slightly softens them. The softened beads deform under the heat and pressure to create a tight seal, such as shown in FIG. 7, around the entire periphery of the molding chamber. This seal prevents foam flash from escaping the molding chamber, and as a result, the amount of trimming required on the plastic foam part is greatly reduced or entirely eliminated. As will be later seen in somewhat greater detail, the preferred plastics for injection molding the cavity member are polyethylene and polypropylene, and cavity members formed from these two materials are heated to approximately 200° F. and approximately 225° F., respectively, for softening the sealing beads formed integrally therewith.

Figure 9:
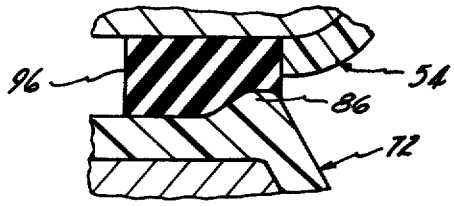
FIG. 9 is a view similar to FIG. 7 showing an additional sealing arrangement.

FIG. 9 shows another arrangement for sealing the foam molding cavity. A compressible sealing gasket 96 is applied to the upper mold member around the periphery of the foam molding chamber in place of the integral lip 58 and bead 60. Bead 86 on the lower mold member is adapted to interengage gasket 96 and compress the same when the mold is closed thereby ensealing the foam molding chamber. While various compressible gasket materials may be used (for example, silicone rubber has been observed to form a good seal), the important consideration in ensealing the foam molding chamber is that one of the interengaged members be more resiliently yieldable than the other.

Projections 64 include a tapered passage 92 formed by pin 48 during injection molding. When cavity member 54 is removed from the injection mold, a small web of plastic blocks the narrow portion of passage 92. This web may be opened to a suitable orifice size so that when cavity member 54 is mounted in cover 68, chamber 90 communicates to atmosphere. Vent passages 92 permit the escape of air in the molding chamber and gases generated therein during the foaming process so that undesirable surface voids or pockets in the foam part are eliminated. Any overflow of foam into passages 92 is readily removable. Generally, passages 92 are placed to communicate troublesome areas of the chamber headspace to atmosphere, their particular location depending upon the particular shape of the foam plastic part and its orientation in the foam mold. Vent passages 92 may be constructed in other shapes as required. More specific details of their construction are set forth in the copending application entitled "Venting Construction For Molds For Forming Plastic Foam Parts," filed simultaneously with the present application. One advantage of vent passages integrally formed with the foam molding cavity member over other types of vent passages is that any possibility of plastic foam intruding between projections 64 and openings 76 is entirely eliminated.

The preferred plastics for injection molding the foam molding cavities are polyethylene and polypropylene. Both materials have inherently excellent release properties and both may be conveniently injection molded. Such release properties permit the foam plastic part to be readily removed from the mold without sticking or tearing. It has been observed that the release properties of polyethylene are better than the release properties of polypropylene and, therefore, polyethylene is to be preferred, especially where the shape of the foam plastic part is more complex and likely to tear upon removal of the molding cavity.

Because of such release characteristics, especially the excellent release characteristics of polyethylene, it is possible to paint the surface of the plastic foam parts in the following manner. Prior to filling the molding cavity with foam, a layer of paint is applied to the foam molding surface, for example, by spraying. When the plastic is foamed within the molding chamber, the paint adheres to the foam plastic rather than the plastic molding cavity member, thereby painting the part. This painting process has been performed with excellent results on polyurethane foam by utilizing a polyurethane base paint, and it is contemplated that the process is suitable with other types of plastic foams. The paint is more permanent and durable than a paint coat applied over a finished foam part. Other types of paint compatible with polyurethane foam have been successfully used in painting polyurethane foam parts by this method. Thus, it is believed that the only requirement for the paint to be used with a particular plastic foam is that it be compatible with the foam plastic. However, the best results have been obtained with polyethylene cavity members, polyurethane base paint and polyurethane foam, and these materials are to be preferred. Polyethylene and polypropylene are extremely solvent resistant and this characteristic allows a wide variety of solvents to be used in paints which are applied to either polyethylene or polypropylene molding cavity members for painting foam plastic parts in accordance with this method. The various solvents can produce various effects such as quick drying, improved weathering, etc.

Both polyethylene and polypropylene may be utilized in the construction of the so-called "living hinge" with the latter being preferred for the use. The improved molding cavity-forming member of the present invention may incorporate "living hinges" to permit molding of parts having die lock or undercut. The foam molding cavity member having one or more "living hinges" could be constructed, for example, to seat in either the base or cover of the mold. After the foam plastic part is formed in the molding cavity, the mold is opened and the molding cavity-forming member removed therefrom to permit the "living hinge" to be flexed open and release the foam plastic part.

A further advantage of injection-molded foam molding cavity members is that foam plastic may be molded with fine surface detail. Because the molding cavity surface is formed under high pressure, it is virtually identical to the exact shape of molding cavity 42, picking up every surface detail in the contoured surfaces of the injection-molding dies. Should fine detail such as a surface texture be included in the contoured portions of the molding dies, this same texture is duplicated in reverse in the foam molding cavity. When foam is then molded in the injection-molded cavity member, the surface texture of the molding dies is substantially duplicated in the skin of the foam part.

Because vent passages 92 are formed of the same material, preferably polyethylene or polypropylene, as the foam molding members, the foam stems which may form therein during the molding of the foam part may be easily removed. For example, the tapered foam stems shown in FIG. 6 may be pulled out of the passage with subsequent separation in their point of connection to the part.

Injection-molded foam molding cavity members of this invention have been found to achieve a longer useful life than other types of plastic cavity members and, therefore, have to be replaced less frequently. At the same time, injection-molded plastic members may be conveniently mass produced on a relatively low cost basis, and, thus, significantly reduce the per unit tooling cost of each foam part and reduce the amount of down time required to replace worn-out molds.

I claim:

1. A method of constructing a mold having a cavity in which a plastic foam part is adapted to be molded, said mold including a pair of separable mold sections, each of which is adapted to receive an injection molded cavity-forming liner which, when the mold sections are closed with one another, cooperate to define said mold cavity, comprising the steps of forming two pair of metal dies, each pair having molding surfaces which correspond with a half section of the exterior surfaces of the foam part to be molded, utilizing each pair of said metal dies to form an injection molding cavity defined by the respective molding surfaces of said two metal dies; subjecting a thermoplastic synthetic resin material to sufficient heat and pressure to plasticize the same and injection molding said material in said injection molding cavity of each pair of said metal dies to form a pair of injection molded thermoplastic liners for said foam mold sections each having an exterior surface contour formed by the molding surface of its respective pair of metal dies which is the reverse of the external surface contour of the two opposite sides of the plastic foam part to be molded; removing said injection molded liners from said pairs of metal dies; and inserting the two injection molded liners in opposed relation, one in each of said separable mold sections such that when the mold sections are closed said exterior surface contours of the two liners cooperate to define a foam molding cavity which corresponds in size, shape and contour to the size, shape and contour of the foam part to be molded therein.

2. The method called for in claim 1 including the steps of forming a recess in at least one of said pair of metal dies at a selected location in said molding surface thereof and, during the step of injection molding, causing said thermoplastic material to flow into said recess so as to form an integral projection on the injection molded liner which extends therefrom in a direction opposite from said exterior surface contour thereof; forming an opening through one of said separable mold sections to register with said projection and through which said projection is adapted to extend to the exterior of the mold section when the injection molded liner is located therein; and forming a passageway through said projection to provide an integral vent passageway in said injection molded liner which vents the foam cavity defined by the two injection molded liners to atmosphere.

3. The method called for in claim 1 including the step of forming a groove in at least one of said pair of metal dies extending peripherally around the molding surface thereof, said groove lying in a flat plane, and, during the step of injection molding, causing said thermoplastic material to flow into said groove so as to form a continuous peripheral bead projecting from and extending in a flat plane around the exterior surface contour of the respective injection molded liner and forming, by injection molding, a peripheral surface on the other injection molded liner which lies in a flat plane and with which said bead is adapted to engage so as to form a seal around said mold cavity at the parting line between the two injection molded liners when the two mold sections are closed with one another.

*4. A method of constructing a mold having a cavity in which a plastic foam part is adapted to be molded, said mold including a pair of separable mold sections, at least one of which is adapted to receive an injection molded cavity-forming liner which, when the mold sections are closed with one another, cooperates with the other mold section to define said mold cavity, comprising the steps of: forming a pair of metal dies having molding surfaces which correspond with one half section of the exterior surface of the foam part to be molded; utilizing said dies to form an injection molding cavity defined by the respec-*

*tive molding surfaces of said two metal dies; subjecting a thermoplastic synthetic resin material to sufficient heat and pressure to plasticize the same and injection molding said material in said injection molding cavity of said pair of metal dies to form an injection molded thermoplastic liner for said one foam mold section having an exterior surface contour formed by the molding surface of the metal dies which is the reverse of the external surface contour of one side of the plastic foam part to be molded;*

*removing said injection molded liner from said dies; and inserting the injection molded liner in said one separable mold section such that when the mold sections are closed said exterior surface contour of the liner cooperates with the other mold section to define a foam molding cavity which corresponds in size, shape and contour to the size, shape and contour of the foam part to be molded therein.*

* * * * *